(12) United States Patent
Montero et al.

(10) Patent No.: US 11,989,564 B2
(45) Date of Patent: May 21, 2024

(54) SYSTEMS AND METHODS FOR ENSURING SECURITY FOR BRING-YOUR-OWN DEVICE SCENARIOS

(71) Applicant: Dell Products L.P., Round Rock, TX (US)

(72) Inventors: Adolfo S. Montero, Pflugerville, TX (US); P B S Naresh Kumar, Hosur (IN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 17/854,372

(22) Filed: Jun. 30, 2022

(65) Prior Publication Data

US 2024/0004669 A1 Jan. 4, 2024

(51) Int. Cl.
*G06F 9/44* (2018.01)
*G06F 8/65* (2018.01)
*G06F 9/4401* (2018.01)

(52) U.S. Cl.
CPC .............. *G06F 9/441* (2013.01); *G06F 8/65* (2013.01)

(58) Field of Classification Search
CPC ........................................................ G06F 1/32
See application file for complete search history.

(56) References Cited

U.S. PATENT DOCUMENTS

| 6,973,587 B1* | 12/2005 | Maity | G06F 9/4416 |
| | | | 714/4.12 |
| 10,042,038 B1* | 8/2018 | Lord | G10L 25/51 |
| 2004/0059900 A1* | 3/2004 | Backman | G06F 9/4416 |
| | | | 713/1 |
| 2015/0138094 A1* | 5/2015 | Kim | G06F 1/1654 |
| | | | 345/173 |

* cited by examiner

*Primary Examiner* — Keshab R Pandey
(74) *Attorney, Agent, or Firm* — Jackson Walker L.L.P.

(57) ABSTRACT

An information handling system may include a processor, a management controller communicatively coupled to the processor for out-of-band management of the information handling system, and configured to determine if the information handling system is docked to a docking station, boot the information handling system from a personal image local to the information handling system if the information handling system is undocked from the docking station, and boot the information handling system from an enterprise image stored on the docking station if the information handling system is docked to the docking station.

12 Claims, 2 Drawing Sheets

SYSTEMS AND METHODS FOR ENSURING SECURITY FOR BRING-YOUR-OWN DEVICE SCENARIOS

TECHNICAL FIELD

The present disclosure relates in general to information handling systems, and more particularly to systems and methods for modifying security or privacy mode of information handling system peripherals.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, companies are moving to "bring-your-own-device" or "BYOD" information technology architectures wherein a business enterprise may provide an enterprise network for computing, such enterprise network configured to couple to personally-owned information handling systems of employees or other end users such that these end users carry out work-related responsibilities on their personal devices, often while such personal devices are coupled to and secured by the enterprise network.

Existing approaches for BYOD architectures pose disadvantages for both end users and the enterprise. With respect to end users, personal devices on enterprise systems are often discouraged due to security threats that may be imposed by executables or data present on a personal device. The BYOD end user may also be concerned about his/her privacy if there is a perception that administrators of the enterprise network have access to snoop personal data of the end user stored on the personal device. In addition, if the administrator of the enterprise network requires particular information technology applications to be installed on the personal device in order to ensure security of the enterprise network, such information technology applications may undesirable consume resources of the personal device, including processing resources, memory resources, and/or network resources.

With respect to an enterprise, an enterprise may be concerned due to a lack of trust of an operating system image configuration of a personal device and any user-installed stacks executing on the personal device. Minimum enterprise requirements to secure the personal device may demand regular antivirus scans, other third-party applications, hard-drive encryption, and/or other measures.

SUMMARY

In accordance with the teachings of the present disclosure, the disadvantages and problems associated with existing approaches to enabling BYOD may be reduced or eliminated.

In accordance with embodiments of the present disclosure, an information handling system may include a processor, a management controller communicatively coupled to the processor for out-of-band management of the information handling system, and configured to determine if the information handling system is docked to a docking station, boot the information handling system from a personal image local to the information handling system if the information handling system is undocked from the docking station, and boot the information handling system from an enterprise image stored on the docking station if the information handling system is docked to the docking station.

In accordance with embodiments of the present disclosure, a method may include determining if an information handling system is docked to a docking station, booting the information handling system from a personal image local to the information handling system if the information handling system is undocked from the docking station, and booting the information handling system from an enterprise image stored on the docking station if the information handling system is docked to the docking station.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
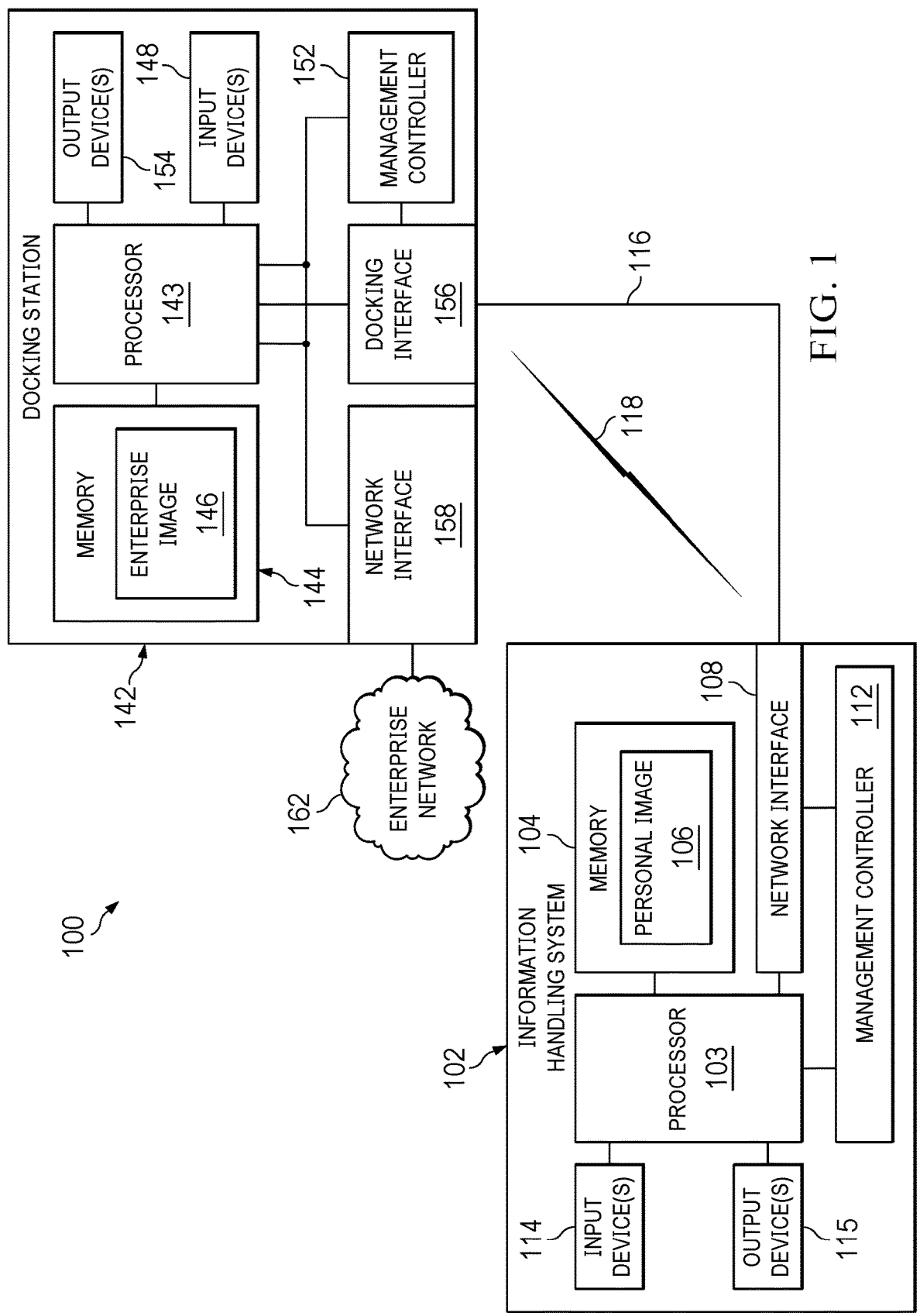
FIG. 1 illustrates a block diagram of an example system including an information handling system and a wireless docking station, in accordance with certain embodiments of the present disclosure.
Figure 2:
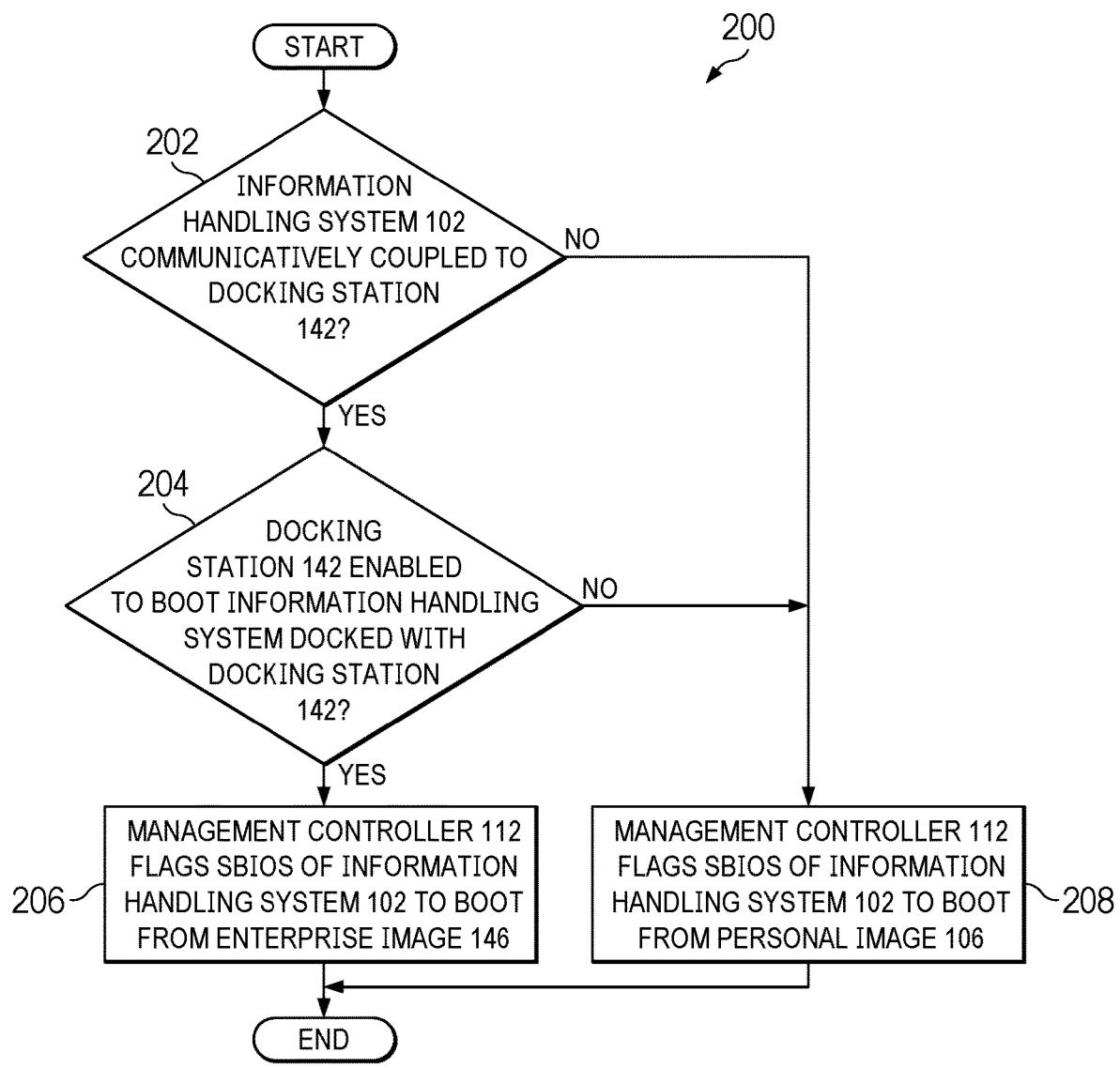
FIG. 2 illustrates a flow chart of an example method for enabling BYOD in an enterprise network, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

The terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (e.g., proximity card, Radio-Frequency Identification (RFID), Near Field Communication (NFC), BLUETOOTH, ISO 14443, ISO 15693, or other suitable standard), IEEE 802.11ad (Wireless Gigabit or "WiGig"), personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser).

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, etc.

FIG. 1 illustrates a block diagram of an example system 100 including an information handling system 102, a wireless docking station 142, and an enterprise network 162, in accordance with certain embodiments of the present disclosure.

In some embodiments, information handling system 102 may be a personal computer. In particular embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a network interface 108 communicatively coupled to processor 103, a management controller 112 coupled to processor 103 and/or network interface 108, one or more input devices 114 communicatively coupled to processor 103, and one or more output devices 115 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, a storage resource, and/or another component of information handling system 102.

Memory 104 may include any system, device, or apparatus configured to retain data (including program instructions) for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a personal image 106. Such personal image 106 may include an operating system, applications, and/or data personal to an end user of information handling system 102. In some embodiments, personal image 106 may be firewalled from any images executing via network interface 108.

Network interface 108 may comprise any suitable system, apparatus, or device operable to serve as an interface between information handling system 102 and another information handling system and/or a network. Network interface 108 may enable information handling system 102 to communicate using any suitable transmission protocol and/or standard. In some embodiments, network interface 108 may be configured to communicate with docking interface 156 of docking station 142 via wire-line transmissions 116. In these or other embodiments, network interface 108 may be configured to communicate with docking interface 156 of docking station 142 via wireless transmissions 118. In these and other embodiments, network interface 108 may comprise a network interface card, or "NIC."

Management controller 112 may be configured to provide management facilities for management of information handling system 102. Such management may be made by management controller 112 even if information handling system 102 is powered off or powered to a standby state. Management controller 112 may include a processor, a memory, and or other components. In certain embodiments, management controller 112 may include or may be an integral part of an embedded controller (EC), baseboard management controller (BMC), or a remote access controller (e.g., a Dell Remote Access Controller or Integrated Dell Remote Access Controller).

Input device(s) 114 may comprise any system, device, or apparatus configured to receive user input or an indication of user input. For example, input device(s) 114 may include a power button, keyboard, mouse, microphone, and/or other suitable input device.

Output device(s) 115 may comprise any system, device, or apparatus configured to output information in the form of visual information, audible information, printed information, and/or other suitable manner. For example, output device(s) 115 may include a display device, an audio transducer (e.g. speaker or headphone), a printer, and/or other suitable output device.

In addition to processor 103, memory 104, network interface 108, management controller 112, input device(s) 114, and/or output device(s) 115, information handling system 102 may include one or more other information handling resources.

Docking station 142 may comprise a docking station, port replicator, or dock that allows information handling system 102 or another electronic device to communicatively couple to information handling resources (e.g., keyboard, monitor, mouse, external storage resources, network interfaces, etc.) attached to or integral to docking station 142. Docking station 142 may allow information handling system 102 to communicatively couple to docking station 142 (and thus the devices communicatively coupled to docking station 142) via wire-line transmissions 116 and/or wireless transmissions 118 communicated between network interface 108 and docking interface 156. In some embodiments, docking station 142 may comprise an information handling system, albeit with functionality and/or structure different than that of information handling system 102. As depicted in FIG. 1, docking station 142 may include a processor 143, a memory 144 communicatively coupled to processor 143, one or more input devices 148 communicatively coupled to processor 143, one or more output devices 154 communicatively coupled to processor 143, a management controller 152 communicatively coupled to processor 143, network interface 158, and/or docking interface 156, a docking interface 156 communicatively coupled to processor 143, and a network interface 158.

Processor 143 may include any system, device, or apparatus configured to interpret and/or execute program instructions and/or process data, and may include, without limitation, a microprocessor, microcontroller, DSP, ASIC, or any other digital or analog circuitry configured to interpret and/or execute program instructions and/or process data. In some embodiments, processor 143 may interpret and/or execute program instructions and/or process data stored in memory 144 and/or another component of docking station 142.

Memory 144 may be communicatively coupled to processor 143 and may include any system, device, or apparatus configured to retain program instructions and/or data for a period of time (e.g., computer-readable media). Memory 144 may include RAM, EEPROM, a PCMCIA card, flash memory, magnetic storage, opto-magnetic storage, or any suitable selection and/or array of volatile or non-volatile memory that retains data after power to docking station 142 is turned off. Memory 144 may be either internal or external to docking station 142.

As shown in FIG. 1, memory 144 may have stored thereon an enterprise image 146. Such enterprise image 146 may include an operating system, applications, and/or data maintained by an administrator of an enterprise. Accordingly, when information handling system 102 is communicatively coupled to (i.e., "docked" with) docking station 142, information handling system 102 may boot from and execute with enterprise image 146. In some embodiments, enterprise image 146 may be firewalled from any local images executing on information handling system 102, thus ensuring information technology security of an enterprise in a BYOD architecture.

Input devices 148 may comprise any system, device, or apparatus configured to receive user input or an indication of user input. For example, input devices 148 may include a power button, keyboard, mouse, microphone, and/or other suitable input device.

Output devices 154 may comprise any system, device, or apparatus configured to output information in the form of visual information, audible information, printed information, and/or other suitable manner. For example, output devices 154 may include a display device, an audio transducer (e.g. speaker or headphone), a printer, and/or other suitable output device.

Management controller 152 may be configured to provide management facilities for management of docking station 142. Such management may be made by management controller 152 even if docking station 142 is powered off or powered to a standby state. Management controller 152 may include a processor, a memory, and or other components. In certain embodiments, management controller 152 may include or may be an integral part of an embedded controller (EC), baseboard management controller (BMC), or a remote access controller (e.g., a Dell Remote Access Controller or Integrated Dell Remote Access Controller).

Docking interface 156 may comprise any suitable system, apparatus, or device operable to serve as a communications interface between docking station 142 and network interface 108 of information handling system 102. Docking interface 156 may be configured to communicate with network interface 108 of information handling system 102 via wire-line transmissions 116 and/or wireless transmissions 118.

In addition to processor 143, memory 144, and docking interface 156, docking station 142 may include one or more other information handling resources.

Enterprise network 162 may be a network and/or fabric configured to connect docking station 142 and/or one or more other information handling systems to one another. In these and other embodiments, enterprise network 162 may include a communication infrastructure, which provides physical connections, and a management layer, which organizes the physical connections and information handling systems communicatively coupled to network enterprise network 162. Enterprise network 162 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Enterprise network 162 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Enterprise network 162 and its various components may be implemented using hardware, software, or any combination thereof.

In operation, an enterprise administrator may, via enterprise network 162, maintain the most-current standard enterprise image 146 on docking station 142, while information handling system 102 may maintain personal image 106 locally in memory 104 and isolated from enterprise image 146. Further, information handling system 102, whenever docked with docking station 142, may boot from the enterprise approved and maintained enterprise image 146 (which may appear as or may appear as stored on a storage volume of information handling system 102), rather than booting from personal image 106. To that end, docking station 142 may be enabled to boot with Secure Boot or a similar secure booting system.

An enterprise administrator may ensure that enterprise image 146 is regularly updated with the latest operating system, applications, and configurations, and docking station 142 may be continuously coupled to enterprise network 162, to enable updates to enterprise image 146 even when information handling system 102 is not coupled to docking station 142. To that end, docking station 142 may be enabled to update with Secure Update or similar image updating system. For example, an enterprise administrator may manage enterprise image 146 to ensure that enterprise image 146 is consistently updated against security threats and/or with latest software tools needed for the various groups of end users of information handling systems.

Further, enterprise image 146 may execute diagnostic and/or security tools (e.g., virus scanning software) when information handling system 102 is undocked from docking station 142 (or is docked with docking station 142 but not being used) to avoid productivity impacts associated with such diagnostic and/or security tools during working hours of the end user.

In addition, any files to be read, modified, or created by an end user while information handling system 102 is docked with docking station 142 may be stored in memory 144 or enterprise network 162. Storing of such work files in the "cloud" of enterprise network 162 may ensure security of enterprise confidential information in the event information handling system 102 is lost or stolen and/or if information handling system 102 is used by a rogue current or former employee who may compromise such confidential information if able to do so. In addition, storage of end user work product in memory 144 and/or enterprise network 162 may enable automatic backup of important work product files to prevent data loss when the end user departs the enterprise.

Once undocked from docking station 142, information handling system 102 may quickly resume a personal-use role by booting to personal image 106.

In some embodiments, an enterprise administrator may segment enterprise image 146 into various job functions such that when booting from enterprise image 146, information handling system 102 may be optimized for certain applications (e.g., computer-aided design tools for engineering, finance tools for accounting, etc.). In these and other embodiments, security levels (e.g., levels of firewalling) may be tailored by policy-based groupings of end users, information handling systems, and/or docking stations.

FIG. 2 illustrates a flow chart of an example method 200 for enabling BYOD in an enterprise network, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, management controller 112 may determine whether information handling system 102 is communicatively coupled to docking station 142. If information handling system 102 is communicatively coupled to docking station 142, method 200 may proceed to step 204. Otherwise, method 200 may proceed to step 208.

At step 204, management controller 112 may determine whether docking station 142 is enabled to boot an information handling system docked with docking station 142. If docking station 142 is enabled to boot an information handling system docked with docking station 142, method 200 may proceed to step 206. Otherwise, method 200 may proceed to step 208.

At step 206, management controller 112 may flag a secure basic input/output system (SBIOS) of information handling system 102 to boot from enterprise image 146. After completion of step 206, method 200 may end.

At step 208, management controller 112 may flag SBIOS of information handling system 102 to boot from personal image 106. After completion of step 208, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a management controller communicatively coupled to the processor for out-of-band management of the information handling system, and configured to:
   determine if the information handling system is docked to a docking station;
   boot the information handling system from a personal image local to the information handling system if the information handling system is undocked from the docking station; and
   boot the information handling system from an enterprise image stored on the docking station if the information handling system is docked to the docking station.

2. The information handling system of claim 1, the management controller further configured to:
   determine if the docking station supports booting the information handling system from the docking station;
   boot the information handling system from the personal image if booting the information handling system from the docking station is unsupported; and
   boot the information handling system from the enterprise image if booting the information handling system from the docking station is supported.

3. A docking station comprising:
   a processor; and
   a memory having stored thereon an enterprise image, the enterprise image configured to, when an information handling system is docked to a docking station, boot the information handling system from the enterprise image.

4. The docking station of claim 3, wherein the enterprise image, from the perspective of the information handling system, appears as or appears as stored on a storage volume of the information handling system.

5. The docking station of claim 3, further comprising a network interface configured to communicatively couple to an enterprise network.

6. The docking station of claim 5, wherein the memory receives updates to the enterprise image from the enterprise network.

7. The docking station of claim 5, wherein the processor is configured to, when the information handling system is docked to a docking station, store files associated with the information handling system to the enterprise network.

8. A method comprising:
   determining if an information handling system is docked to a docking station;
   booting the information handling system from a personal image local to the information handling system if the information handling system is undocked from the docking station; and
   booting the information handling system from an enterprise image stored on the docking station if the information handling system is docked to the docking station.

9. The method of claim 8, further comprising:
   determining if the docking station supports booting the information handling system from the docking station;
   booting the information handling system from the personal image if booting the information handling system from the docking station is unsupported; and
   booting the information handling system from the enterprise image if booting the information handling system from the docking station is supported.

10. The method of claim 8, wherein the enterprise image, from the perspective of the information handling system, appears as or appears as stored on a storage volume of the information handling system.

11. The method of claim 8, further comprising updating the enterprise image from an enterprise network communicatively coupled to the docking station.

12. The method of claim 8, further comprising storing files associated with the information handling system to an enterprise network communicatively coupled to the docking station.

* * * * *